US012615342B2

(12) United States Patent     (10) Patent No.:   US 12,615,342 B2

Tachi     (45) Date of Patent:   Apr. 28, 2026

(54) VIDEO SIGNAL TRANSMISSION DEVICE, VIDEO SIGNAL RECEIVING DEVICE, AND VIDEO SIGNAL TRANSCEIVING SYSTEM

(71) Applicant: LAPIS Technology Co., Ltd., Yokohama (JP)

(72) Inventor: Satoshi Tachi, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 60 days.

(21) Appl. No.: 18/899,903

(22) Filed: Sep. 27, 2024

(65) Prior Publication Data

US 2025/0113006 A1    Apr. 3, 2025

(30) Foreign Application Priority Data

Sep. 29, 2023    (JP) ................................. 2023-170601

(51) Int. Cl.
| | |
|---|---|
| *H04N 5/38* | (2006.01) |
| *H04N 5/44* | (2011.01) |
| *H04N 9/64* | (2023.01) |
| *H04N 23/12* | (2023.01) |

(52) U.S. Cl.
CPC ................. *H04N 5/38* (2013.01); *H04N 5/44* (2013.01); *H04N 9/64* (2013.01); *H04N 23/12* (2023.01)

(58) Field of Classification Search
CPC ........... H04N 5/44; H04N 5/38; H04N 23/12; H04N 9/64
USPC ......................................................... 348/266
See application file for complete search history.

(56) References Cited

U.S. PATENT DOCUMENTS

| | | | | |
|---|---|---|---|---|
| 9,854,247 | B2 * | 12/2017 | Ando ..................... | H04N 19/61 |
| 10,008,146 | B2 * | 6/2018 | Guo ...................... | G09G 3/2092 |
| 10,623,692 | B2 * | 4/2020 | O'Connell ............. | H04N 7/102 |
| 12,198,294 | B2 * | 1/2025 | Trott ..................... | H04N 23/88 |
| 2015/0117774 | A1 * | 4/2015 | Yang .................... | G09G 3/2003 |
| | | | | 382/166 |
| 2015/0319444 | A1 * | 11/2015 | Ando ................... | H04N 19/182 |
| | | | | 375/240.12 |
| 2016/0249102 | A1 * | 8/2016 | Minemura ......... | H04N 21/4854 |
| 2017/0124682 | A1 * | 5/2017 | Azuma ................... | G06T 5/10 |
| 2017/0140695 | A1 * | 5/2017 | Guo ...................... | G09G 3/2092 |
| 2017/0318300 | A1 * | 11/2017 | Suzuki ................. | H04N 19/186 |
| 2017/0339386 | A1 * | 11/2017 | Sakamoto ........... | H04N 9/8042 |
| 2020/0021775 | A1 * | 1/2020 | O'Connell ............. | G08C 15/06 |
| 2021/0014530 | A1 * | 1/2021 | Ando ................... | H04N 19/593 |

(Continued)

FOREIGN PATENT DOCUMENTS

JP     2004-088295 A    3/2004

*Primary Examiner* — Pritham D Prabhakher
(74) *Attorney, Agent, or Firm* — Rabin & Berdo, P.C.

(57)        ABSTRACT

A video signal transmission device including: an imaging device that is an imaging device including pixels of plural colors arrayed in the same line, and that outputs RAW data generated by performing imaging; a conversion section that takes the RAW data output from the imaging device and rearranges pixel data such that pixel data of the same color is contiguous for each set of plural lines of a first direction; a digital-to-analog conversion section that converts digital data that has been converted by the conversion section into an analogue signal; and a transmission section that transmits the analogue signal that has been converted by the digital-to-analog conversion section.

9 Claims, 4 Drawing Sheets

(56)         References Cited

U.S. PATENT DOCUMENTS

2022/0094862 A1\*   3/2022  Jung  ..................... H04N 25/78
2023/0245269 A1\*   8/2023  Trott  .................... G06T 3/4046
                                                          382/162

\* cited by examiner

VIDEO SIGNAL TRANSMISSION DEVICE, VIDEO SIGNAL RECEIVING DEVICE, AND VIDEO SIGNAL TRANSCEIVING SYSTEM

CROSS-REFERENCE TO RELATED APPLICATION

The present application claims priority under 35 U.S.C. § 119 to Japanese Patent Application No. 2023-170601 filed on Sep. 29, 2023. The above application is hereby expressly incorporated by reference, in its entirety, into the present application.

BACKGROUND

Technical Field

The present disclosure relates to a video signal transmission device, a video signal receiving device, and a video signal transceiving system.

Related Art

Japanese Patent Application Laid-Open (JP-A) No. 2004-088295 describes converting RAW data output from an imaging device into luminance/chrominance (YC) data. YC data is able to be converted into an analogue signal for analogue transmission as a composite video signal, for example, by National Television System Committee (NTSC).

Recently there is a desire to transmit RAW data output from an imaging device using analogue transmission, which is cheaper when compared to digital transmission.

However, an issue arises when RAW data is converted "as is" into an analogue gradation voltage, in that image quality deterioration readily occurs in transmission circuits, transmission paths, and reception circuits during transmission due to spectrum components having a large-bandwidth.

In consideration of the above circumstances, an object of the present disclosure is to provide a video signal transmission device, a video signal receiving device, and a video signal transceiving system that achieve suppressed image quality deterioration when performing analogue transmission of RAW data.

SUMMARY

A video signal transmission device of the present disclosure includes: an imaging device that is an imaging device including pixels of plural colors arrayed in the same line, and that outputs RAW data generated by performing imaging; a conversion section that takes the RAW data output from the imaging device and rearranges pixel data such that pixel data of the same color is contiguous for each set of plural lines of a first direction; a digital-to-analog conversion section that converts digital data that has been converted by the conversion section into an analogue signal; and a transmission section that transmits the analogue signal that has been converted by the digital-to-analog conversion section.

A video signal receiving device of the present disclosure includes: a receiving section that receives an analogue signal transmitted from the video signal transmission device of the present disclosure; an analogue-to-digital conversion section that converts the analogue signal received by the receiving section into digital data; and a reverse conversion section that takes the digital data output from the analogue-to-digital conversion section and performs reverse conversion on each of the first direction lines into an order of colors of RAW data as output by the imaging device.

A video signal transceiving system of the present disclosure includes the video signal transmission device of the present disclosure, and the video signal receiving device of the present disclosure.

BRIEF DESCRIPTION OF THE DRAWINGS

Exemplary embodiments will be described in detail based on the following figures, wherein.

DETAILED DESCRIPTION

Figure 1:
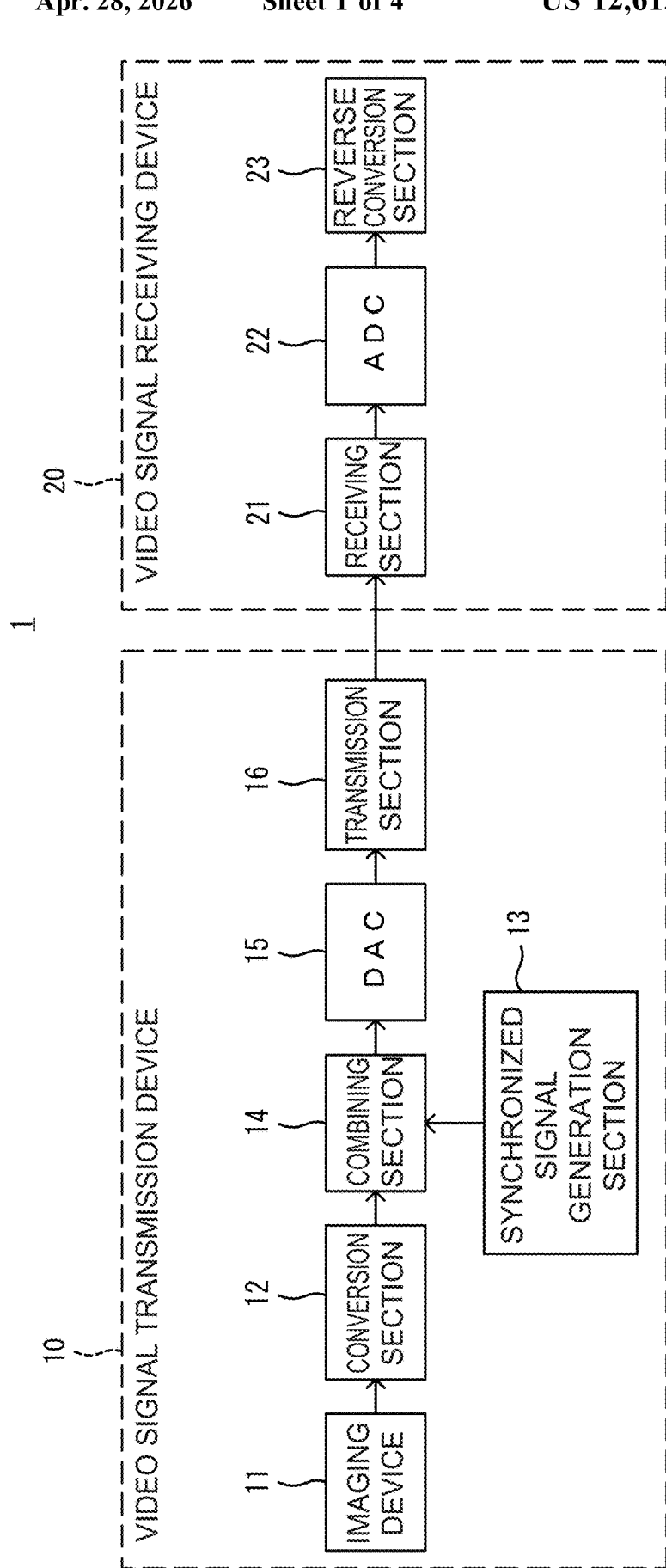
FIG. 1 is a diagram illustrating a schematic configuration of a video signal transceiving system of an exemplary embodiment of the present disclosure.
Figure 2:
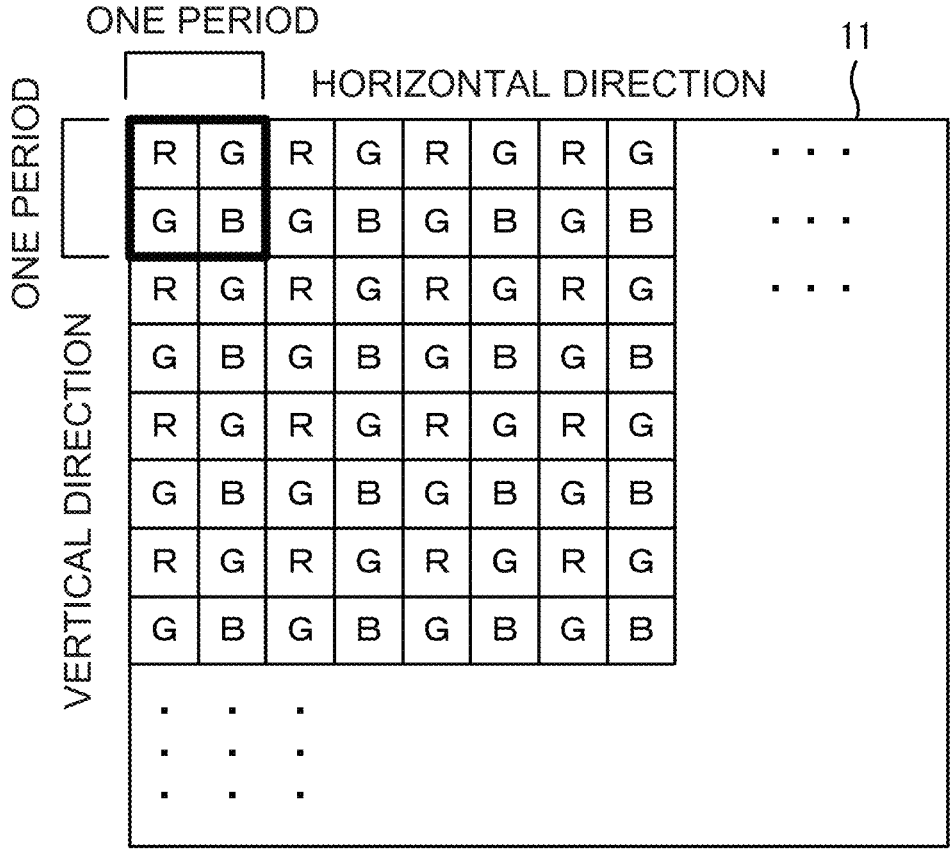
FIG. 2 is a diagram illustrating a schematic configuration of an imaging device.

Next, description follows regarding an exemplary embodiment of the present disclosure, with reference to the drawings. FIG. 1 is a diagram illustrating a schematic configuration of a video signal transceiving system 1 of an exemplary embodiment of the present disclosure. FIG. 2 is a diagram illustrating a schematic configuration of an imaging device.

As illustrated in FIG. 1, the video signal transceiving system 1 of the present exemplary embodiment includes a video signal transmission device 10 and a video signal receiving device 20.

The video signal transmission device 10 includes an imaging device 11, a conversion section 12, a synchronized signal generation section 13, a combining section 14, a digital-to-analog converter (DAC) 15, and a transmission section 16. Note that the DAC 15 is an example of a digital-to-analog conversion section of technology disclosed herein.

The imaging device 11 is an imaging device including pixels of plural colors arrayed in the same horizontal direction line, and outputs RAW data generated by performing imaging. Note that the horizontal direction is an example of a first direction in technology disclosed herein.

As illustrated in FIG. 2, in the imaging device 11 of the present exemplary embodiment, pixels of three colors, these being red pixels, green pixels, and blue pixels, are arrayed in a Bayer array. Note that sometimes hereafter a red pixel will be referred to as pixel R, a green pixel will be referred to as pixel G, and a blue pixel will be referred to as pixel B.

The Bayer array is configured by two lines as one period in the vertical direction, two lines as one period in the horizontal direction thereof, with the Bayer array configured by four pixels in which a horizontal direction first line is an R pixel and a G pixel and a horizontal direction second line is a G pixel and a B pixel.

Returning to FIG. 1, the conversion section 12 performs processing on RAW data output from the imaging device 11 such that for each set of plural horizontal direction lines, pixel data is rearranged such that pixel data of the same color is contiguous.

The synchronized signal generation section 13 generates a synchronized signal when analogue transmission is to be performed.

The combining section 14 generates digital data resulting from the digital data output from the conversion section 12 being combined with the synchronized signal generated by the synchronized signal generation section 13.

The DAC 15 converts the digital data that has been converted by the conversion section 12 into an analogue signal, and more specifically converts, into an analogue signal, digital data resulting from the digital data output from the conversion section 12 and the synchronized signal generated by the synchronized signal generation section 13 being combined by the combining section 14.

The transmission section 16 transmits the analogue signal converted by the DAC 15.

The video signal receiving device 20 includes a receiving section 21, an analog-to-digital converter (ADC) 22, and a reverse conversion section 23. The ADC 22 is an example of an analogue-to-digital conversion section of technology disclosed herein.

The receiving section 21 receives an analogue signal transmitted from the video signal transmission device 10. The ADC 22 converts the analogue signal received by the receiving section 21 into digital data. The reverse conversion section 23 takes the digital data output from the ADC 22, and performs reverse conversion on each horizontal direction line into an order of colors of RAW data as output by the imaging device 11.

Figure 3:
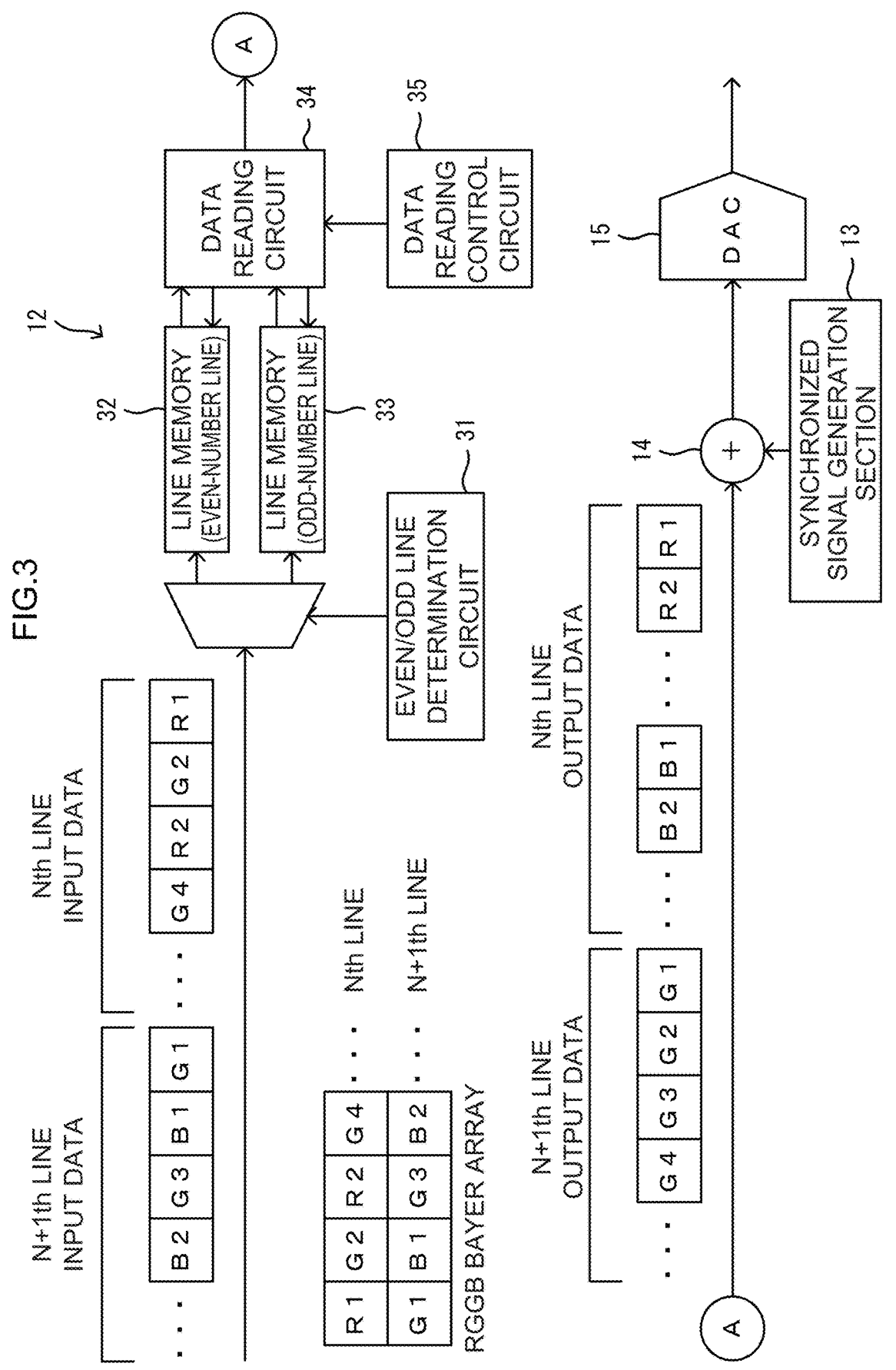
FIG. 3 is a diagram to explain processing during analogue signal transmission in a video signal transmission device.

Next, description follows regarding processing during analogue signal transmission in the video signal transmission device 10 of the video signal transceiving system 1 of the present exemplary embodiment, with reference to FIG. 3.

The video signal transmission device 10 of the present exemplary embodiment converts the RAW data directly into an analogue signal, and transmits the analogue signal.

A bandwidth of a general component signal (analogue signal) containing a luminance signal and a color difference signal is determined by a resolution of input video.

In contrast thereto, in cases in which RAW data is converted into a direct analogue signal, pixel values need to be converted "as is" into an analogue signal, with this meaning that a signal bandwidth of an image is wider, and the amplitude is also larger. This means that extremely high performance DAC is needed in circuit design, which is impractical.

In order to eliminate such an issue, the video signal transmission device 10 of the present exemplary embodiment performs the following processing when converting RAW data into a direct analogue signal.

As illustrated in FIG. 3, the conversion section 12 includes an even/odd line determination circuit 31, an even line-number line memory 32, an odd line-number line memory 33, a data reading circuit 34, and a data reading control circuit 35. The even line-number line memory 32 and the odd line-number line memory 33 are each examples of a storage section of technology disclosed herein.

The conversion section 12 rearranges the pixel data so that pixel data of the same color is contiguous for each set of two lines worth of horizontal direction lines, which is the number of lines of the period of the Bayer array in the vertical direction.

Specifically, whether or not the RAW data output from the imaging device 11 is an even number line or an odd number line is determined by the even/odd line determination circuit 31 for each horizontal direction line, with even number lines being stored in the even line-number line memory 32, and odd number lines being stored in the odd line-number line memory 33.

The data reading control circuit 35 controls the data reading circuit 34, reads pixel data of the same color contiguously and sequentially from the even line-number line memory 32 and the odd line-number line memory 33, and outputs the read pixel data as digital data for each line to a later stage.

Specifically, the data reading control circuit 35, rearranges pixel data of the pixels R and pixels B in the Bayer array into pixel data such that pixel data of the same color is contiguous, outputs this as an $N^{th}$ line of digital data, and rearranges pixel data of the G pixels in the Bayer array into a horizontal direction array sequence and outputs this as an $N+1^{th}$ line of digital data.

In the example of FIG. 3, in the imaging device 11 a pixel R1, a pixel G2, a pixel R2, a pixel G4, . . . , are arrayed in sequence from the left as $N^{th}$ line pixels, and a pixel G1, a pixel B1, a pixel G3, a pixel B2, . . . , are arrayed in sequence from the left as $N+1^{th}$ line pixels. Note that although not illustrated, in the imaging device 11, in addition to the above pixels, pixels of the same array pattern are also arrayed periodically in the horizontal direction and the vertical direction.

The $N^{th}$ line of RAW data output from the imaging device 11 is stored in the even line-number line memory 32 by the even/odd line determination circuit 31, and the $N+1^{th}$ line of RAW data output from the imaging device 11 is stored in the odd line-number line memory 33 by the even/odd line determination circuit 31.

The data reading control circuit 35 controls the data reading circuit 34 to rearrange the pixel data into the sequence, from the start, of pixel R1, pixel R2, . . . , pixel B1, pixel B2, . . . , and outputs this as the $N^{th}$ line of digital data.

Moreover, the data reading control circuit 35 controls the data reading circuit 34 to rearrange the pixel data into the sequence, from the start, of pixel G1, pixel G2, pixel G3, pixel G4, . . . , and outputs this as the $N+1^{th}$ line of digital data.

The combining section 14 generates digital data resulting from the digital data output from the conversion section 12 being combined with the synchronized signal generated by the synchronized signal generation section 13. The DAC 15 converts the digital data generated by the combining section 14 into an analogue signal.

An imaging subject such as a person, landscape, or the like for imaging by the imaging device 11 is often configured by parts in which the same color or similar colors are collected together. However, due to using pixels R, pixels G, and pixels B in the imaging device 11 to separately record the colors of the imaging subject as an R component, a G component, and a B component, there are few instances in which signal values of adjacent pixels are the same value or a similar value.

The video signal transmission device 10 of the present exemplary embodiment rearranges the RAW data output from the imaging device 11 as described above such that pixel data of the same color is contiguous, with this meaning that signal values of adjacent pixels are more likely to be the same value or a similar value.

The video signal transmission device 10 of the present exemplary embodiment converts, into an analogue signal, the digital data resulting from rearranging such that pixel data of the same color is contiguous, and so enables a reduction in high frequency components in the analogue signal.

This thereby enables transmission with suppressed image quality deterioration to be performed when performing analogue transmission of RAW data.

Modified Examples

Although the video signal transceiving system 1 of an exemplary embodiment of the present disclosure has been described, the present disclosure is not limited to the above exemplary embodiment, and may be modified as appropriate.

For example, an array pattern of pixels of the imaging device 11 is not limited to the pattern illustrated in FIG. 2 and described above, and may be another pattern.

Figure 4:
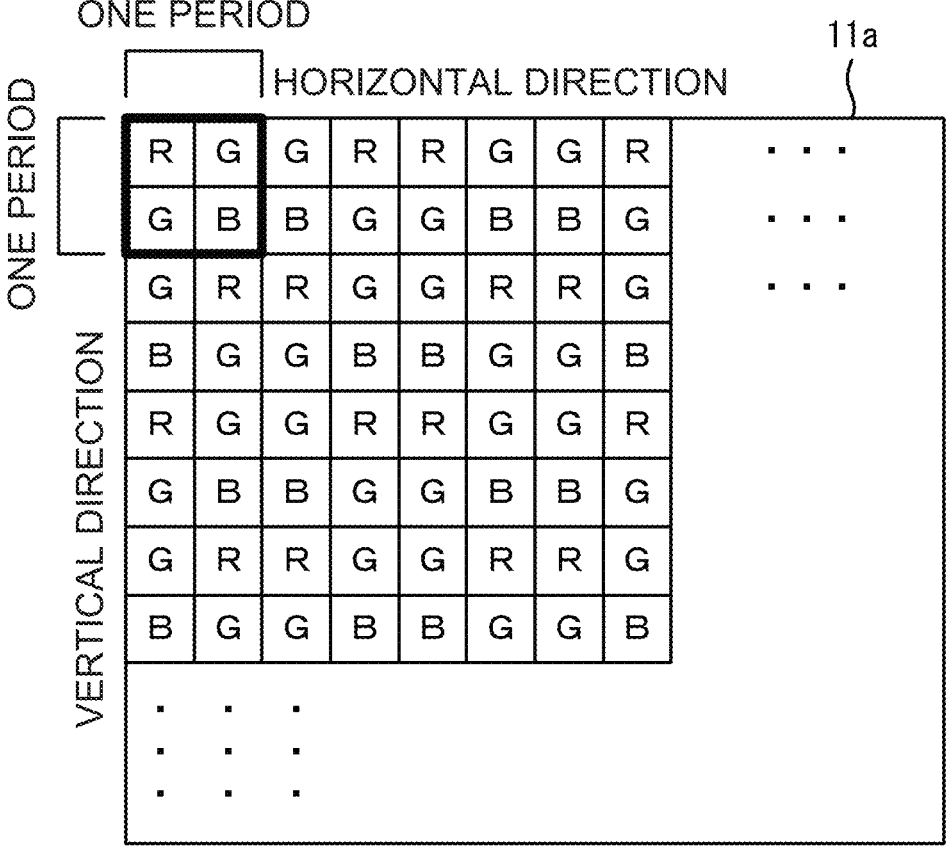
FIG. 4 is a diagram illustrating a schematic configuration of an imaging device.

For example, as in the imaging device 11a illustrated in FIG. 4, for an RGGB Bayer array with two lines for one period in the vertical direction and two lines for one period in the horizontal direction, a pattern of the Bayer array may be left-right reversed for Bayer arrays adjacent in the up-down and left-right directions.

Moreover, an array pattern of pixels of the imaging device 11 may, for example, be an array of any pattern as long as it is a pattern in which pixels of plural colors have been arrayed in the same line, such as an array with three lines for one period in the vertical direction and three lines for one period in the horizontal direction.

Moreover, in the present exemplary embodiment, the conversion section 12 is configured to rearrange pixel data such that pixel data of the same color is contiguous for each set of two lines worth of horizontal direction lines, which is the number of lines of the period of the Bayer array in the vertical direction, however the conversion section 12 may be configured to rearrange pixel data such that pixel data of the same color is contiguous for each set of horizontal direction lines of a number that is an integer multiple of the period of the Bayer array in the vertical direction.

Moreover in the above exemplary embodiment, the conversion section 12 is configured so as to rearrange pixel data such that pixel data of the same color is contiguous for data for all pixels in the horizontal direction lines, however the conversion section 12 may be configured so as to rearrange pixel data such that pixel data of the same color is contiguous for each set of pixel data that is part of the horizontal direction lines and that is a set of pixel data of a number that is an integer multiple of the period of the Bayer array in the horizontal direction.

Moreover, in addition to the above, appropriate modifications, such as omitting redundant parts, adding or substituting new elements, and the like, may be implemented to the content described above and the content of the drawings within a range not departing from the spirit of technology disclosed herein.

The video signal transmission device of the present disclosure enables transmission with suppressed image quality deterioration to be performed when performing analogue transmission of RAW data.

The video signal receiving device of the present disclosure enables an analogue signal with suppressed image quality deterioration to be received when performing analogue transmission of RAW data.

The video signal transceiving system of the present disclosure enables transceiving with suppressed image quality deterioration to be performed when performing analogue transmission of RAW data.

Supplements

The following Supplements are preferable embodiments of the present disclosure.

Supplement 1

A video signal transmission device including:

an imaging device that is an imaging device including pixels of plural colors arrayed in the same line, and that outputs RAW data generated by performing imaging;

a conversion section that takes the RAW data output from the imaging device and rearranges pixel data such that pixel data of the same color is contiguous for each set of plural lines of a first direction;

a digital-to-analog conversion section that converts digital data that has been converted by the conversion section into an analogue signal; and a transmission section that transmits the analogue signal that has been converted by the digital-to-analog conversion section.

Supplement 2

The video signal transmission device of Supplement 1, wherein:

the imaging device includes pixels of plural colors arrayed in a Bayer array; and the conversion section rearranges pixel data such that pixel data of the same color is contiguous for each set of lines in the first direction of a number that is an integer multiple of a period of a Bayer array in a second direction orthogonal to the first direction.

Supplement 3

The video signal transmission device of Supplement 2, wherein the conversion section rearranges pixel data such that pixel data of the same color is contiguous for each set of the first direction lines that is the number of lines of one period worth of the Bayer array in the second direction.

Supplement 4

The video signal transmission device of Supplement 2 or Supplement 3, wherein the conversion section rearranges pixel data such that pixel data of the same color is contiguous for each set of pixel data that is part of the first direction lines and that is pixel data of a number that is an integer multiple of the period of the Bayer array in the first direction.

Supplement 5

The video signal transmission device of any one of Supplement 2 to Supplement 4, further including a synchronized signal generation section that generates a synchronization signal, wherein:

the conversion section includes a storage section for saving the RAW data output from the imaging device for each set of plural of the first direction lines, reads pixel data of the same color contiguously and sequentially from the storage section, and outputs the read pixel data as digital data for each line; and the digital-to-analog conversion section converts, into an analogue signal, digital data resulting from combining the digital data output from the conversion section with the synchronized signal generated by the synchronized signal generation section.

Supplement 6

The video signal transmission device of Supplement 5, wherein:

an array of pixels of the imaging device is a Bayer array that has two lines for one period of the Bayer array in the second direction and that is configured from four pixels of a red pixel, a green pixel, a green pixel, and a blue pixel; and the conversion section rearranges pixel data that is pixel data of red pixels and blue pixels in the Bayer array such that pixel data of the same color is contiguous and outputs this as digital data of one line from out of two lines, and rearranges pixel data of green pixels in the Bayer array in an array sequence of the first direction and outputs this as digital data of the other line from out of the two lines.

Supplement 7

A video signal receiving device including:

a receiving section that receives an analogue signal transmitted from the video signal transmission device of any one of Supplement 1 to Supplement 6;

an analogue-to-digital conversion section that converts the analogue signal received by the receiving section into digital data; and a reverse conversion section that takes the digital data output from the analogue-to-digital conversion section and performs reverse conversion on each of the first direction lines into an order of colors of RAW data as output by the imaging device.

Supplement 8

A video signal transceiving system including:

the video signal transmission device of any one of Supplement 1 to Supplement 6; and the video signal receiving device of Supplement 7.

Supplement 9

The video signal transceiving system of Supplement 8, wherein:

the imaging device includes pixels of a plurality of colors arrayed in a Bayer array; and the conversion section rearranges pixel data such that pixel data of the same color is contiguous for each set of lines in the first direction that is a number that is an integer multiple of a period of a Bayer array in a second direction orthogonal to the first direction.

What is claimed is:

1. A video signal transmission device comprising:

an imaging device that is an imaging device including pixels of a plurality of colors arrayed in the same line, and that outputs RAW data generated by performing imaging;

a conversion section that takes the RAW data output from the imaging device and rearranges pixel data such that pixel data of the same color is contiguous for each set of a plurality of lines of a first direction;

a digital-to-analog conversion section that converts digital data that has been converted by the conversion section into an analogue signal; and a transmission section that transmits the analogue signal that has been converted by the digital-to-analog conversion section.

2. The video signal transmission device of claim 1, wherein:

the imaging device includes pixels of a plurality of colors arrayed in a Bayer array; and the conversion section rearranges pixel data such that pixel data of the same color is contiguous for each set of lines in the first direction that is a number that is an integer multiple of a period of a Bayer array in a second direction orthogonal to the first direction.

3. The video signal transmission device of claim 2, wherein the conversion section rearranges pixel data such that pixel data of the same color is contiguous for each set of the first direction lines that is the number of lines of one period worth of the Bayer array in the second direction.

4. The video signal transmission device of claim 2, wherein the conversion section rearranges pixel data such that pixel data of the same color is contiguous for each set of pixel data that is part of the first direction lines and that is pixel data of a number that is an integer multiple of the period of the Bayer array in the first direction.

5. The video signal transmission device of claim 2, further comprising a synchronized signal generation section that generates a synchronization signal, wherein:

the conversion section includes a storage section for saving the RAW data output from the imaging device for each set of a plurality of the first direction lines, reads pixel data of the same color contiguously and sequentially from the storage section, and outputs the read pixel data as digital data for each line; and the digital-to-analog conversion section converts, into an analogue signal, digital data resulting from combining the digital data output from the conversion section with the synchronized signal generated by the synchronized signal generation section.

6. The video signal transmission device of claim 5, wherein:

an array of pixels of the imaging device is a Bayer array that has two lines for one period of the Bayer array in the second direction and that is configured from four pixels of a red pixel, a green pixel, a green pixel, and a blue pixel; and the conversion section rearranges pixel data that is pixel data of red pixels and blue pixels in the Bayer array such that pixel data of the same color is contiguous and outputs this as digital data of one line from out of two lines, and rearranges pixel data of green pixels in the Bayer array in an array sequence of the first direction and outputs this as digital data of the other line from out of the two lines.

7. A video signal receiving device that receives an analogue signal transmitted from a video signal transmission device, which includes an imaging device that is an imaging device including pixels of a plurality of colors arrayed in the same line, and that outputs RAW data generated by performing imaging, a conversion section that takes the RAW data output from the imaging device and rearranges pixel data such that pixel data of the same color is contiguous for each set of a plurality of lines of a first direction, a digital-to-analog conversion section that converts digital data that has been converted by the conversion section into an analogue signal, and a transmission section that transmits the analogue signal that has been converted by the digital-to-analog conversion section, the video signal transmission device comprising:

a receiving section that receives the analogue signal;

an analogue-to-digital conversion section that converts the analogue signal received by the receiving section into digital data; and a reverse conversion section that takes the digital data output from the analogue-to-digital conversion section and performs reverse conversion on each of the first direction lines into an order of colors of RAW data as output by the imaging device.

8. A video signal transceiving system comprising:

a video signal transmission device, the video signal transmission device including an imaging device that is an imaging device including pixels of a plurality of colors arrayed in the same line, and that outputs RAW data generated by performing imaging, a conversion section that takes the RAW data output from the imaging device and rearranges pixel data such that pixel data of the same color is contiguous for each set of a plurality of lines of a first direction, a digital-to-analog conversion section that converts digital data that has been converted by the conversion section into an analogue signal, a transmission section that transmits the analogue signal that has been converted by the digital-to-analog conversion section; and a video signal receiving device, including a receiving section that receives the analogue signal transmitted by the transmission section of the video signal transmission device, an analogue-to-digital conversion section that converts the analogue signal received by the receiving section into digital data, and a reverse conversion section that takes the digital data output from the analogue-to-digital conversion section and performs reverse conversion on each of the first direction lines into an order of colors of RAW data as output by the imaging device.

9. The video signal transceiving system of claim 8, wherein:

the imaging device includes pixels of a plurality of colors arrayed in a Bayer array; and the conversion section rearranges pixel data such that pixel data of the same color is contiguous for each set of lines in the first direction that is a number that is an integer multiple of a period of a Bayer array in a second direction orthogonal to the first direction.

* * * * *